Feb. 16, 1926.  
C. AALBORG  
1,572,871  
GRAPHIC METER CONTROL MECHANISM  
Filed Sept. 2, 1922
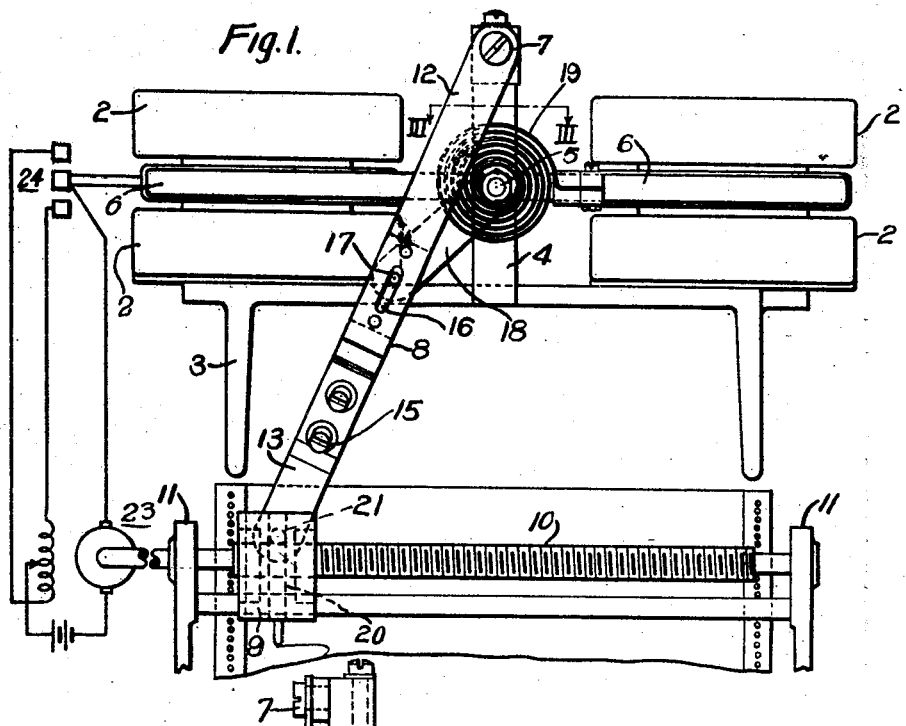
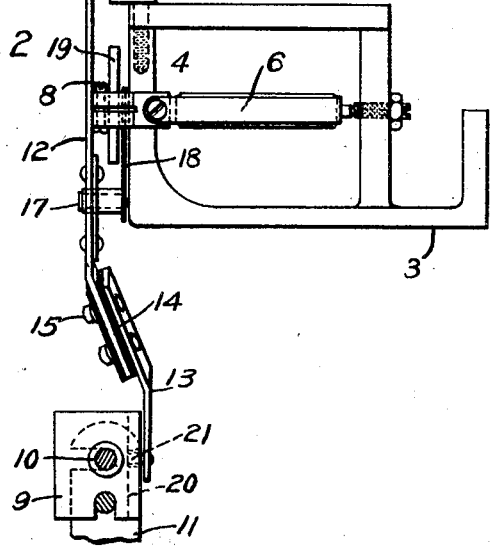
WITNESSES:  
INVENTOR  
Christian Aalborg  
BY  
Wesley G. Carr  
ATTORNEY Patented Feb. 16, 1926.

1,572,871

UNITED STATES PATENT OFFICE.

CHRISTIAN AALBORG, OF PITTSBURGH, PENNSYLVANIA, ASSIGNOR TO WESTING-HOUSE ELECTRIC & MANUFACTURING COMPANY, A CORPORATION OF PENNSYL-VANIA.

GRAPHIC-METER-CONTROL MECHANISM.

Application filed September 2, 1922. Serial No. 585,277.

*To all whom it may concern:*

Be it known that I, CHRISTIAN AALBORG, a citizen of the United States, and a resident of Pittsburgh, in the county of Allegheny and State of Pennsylvania, have invented a new and useful Improvement in Graphic-Meter-Control Mechanisms, of which the following is a specification.

My invention relates to electrical measuring instruments and particularly to means for controlling the movement of the pen or stylus of a recording instrument.

One object of my invention is to provide a device of the above-indicated character that shall be more accurately responsive to actuating impulses over the entire range of its indicating movement.

Another object of my invention is to provide means to so compensate for relative angular movement between the movable member of a Kelvin balance and a rectilinearly movable pen or stylus as to oppose movement of the balance in proportion to movement of the pen.

In co-pending applications of R. T. Pierce, Serial Nos. 574,259, 574,260 and 574,261, filed July 11, 1922, electrical measuring instruments, and assigned to the Westinghouse Electric & Manufacturing Company, to which reference may be had to assist in understanding this invention, are set forth other structures operative in accordance with the broad principle of compensating for the angular relative movement between a Kelvin balance and a recording pen.

It has heretofore been usual, in recording instruments of the relay type embodying a Kelvin balance and a rectilinearly movable stylus carriage, as shown in Patent No. 1,289,503, electrical measuring instrument, issued Dec. 31, 1918, to P. MacGahan, to provide a spring, connected between the balance and the carriage, to oppose movement of the balance in accordance with movement of the stylus. This construction caused inaccuracies in the operation of the instrument by reason of the differences in amount of movement between the balance and the stylus. In other words, by reason of the difference in the increments of angular movement of the balance about its pivot relative to the increments of rectilinear movement of the stylus, the spring was not biased uniformly or in strict proportion to movement of the stylus over the entire range of movement of the latter.

My invention is an improvement on the MacGahan device, above referred to, in that certain errors, one of which occurs in accordance with the sine of the angle of deflection of a pivoted cam member therein and another of which may be caused by frictional wear of the cam surface, are substantially eliminated.

In practicing my invention, I provide two arms that are so pivoted adjacent to the axis of the Kelvin balance and connected at their outer ends to the pen carriage of the instrument as to uniformly oppose movement of the balance in accordance with movement of the pen carriage.

Figure 1 of the accompanying drawings is a view of a portion of a measuring instrument embodying my invention, and Fig. 2 is a view taken at right angles to a portion of Fig. 1.

Stationary coils 2 of a Kelvin balance may be suitably supported on a bracket 3, constituting a portion of the instrument frame, which carries a vertical standard or bracket 4. The latter supports a pivot pin 5, upon which is mounted the movable member 6 of the Kelvin balance, and a pin 7 to which is pivoted a depending arm 8.

A traveling nut member 9, constituting supporting means or carriage for a pen or stylus 22, is mounted on a screw shaft 10 that is supported in bearing bracket members 11.

The arm 8 comprises upper and lower sections 12 and 13, respectively, that are insulated from each other by a body of insulation 14 and connected by screws or rivets 15. A radial slot 16 is provided at an intermediate portion of the arm 8 for the reception of a pin 17 at the outer end of an arm 18, that is mounted to turn freely on the pin 5. A spiral spring 19 is connected, at its inner end, to the arm 18 and, at its outer end, to the member 6. A vertical slot 20 in the nut 9 is adapted to receive a pin 21 carried by the lower end of the arm 8.

The screw shaft 10 is adapted to be rotated by a pilot motor 23 that is controlled by the member 6 through usual contact members 24. Accordingly, when the Kelvin balance is energized in accordance with a quantity to be measured, the nut 9 will be moved in proportion to the value of that quantity.

In operation, when the nut 9 advances along the shaft 10, the pins 17 and 21 are so moved in the slots 16 and 20, respectively, as to cause the arm 8 to move the arm 18 by substantially uniform amounts in accordance with the movement of the nut 9. Hence, the spring 19 is wound and unwound, by substantially uniform amounts, in proportion to movements of the nut 9, and the member 6 is constantly opposed by a force equal to the actuating force thereof.

By my invention, a recording instrument, of the type described, is obtained which is delicately and accurately responsive to the quantity being measured, throughout the range of the instrument.

While I have shown and described a particular form of my invention, changes may be effected therein without departing from the spirit and scope thereof, as set forth in the appended claims.

I claim as my invention:

1. In a measuring instrument, the combination with a rectilinearly movable indicating member and a pivoted control member therefor, of an arm pivoted to move independently about the pivot axis of the control member, means for opposing movement of the control member and a second arm having a stationary pivot axis and yieldably connected to said first arm and to the indicating member.

2. In a measuring instrument, the combination with a rectilinearly movable indicating member and a pivoted control member therefor, of an arm pivoted to move independently about the pivot axis of the control member, a second arm having a stationary pivot axis and yieldably connected to said first arm and to the indicating member, and means disposed between the first arm and the control member and responsive to movement of the indicating member for opposing movement of the control member.

3. In a measuring instrument, the combination with a rectilinearly movable indicating member and a pivoted control member therefor, of an arm pivoted to move about the pivot axis of the control member, a spring connected between the control member and the arm, and a second arm having a stationary pivot axis offset with respect to the pivot axis of the said first arm and a lost-motion connection to said first arm and to the indicating member.

4. In a measuring instrument, the combination with a horizontally movable indicating member and a Kelvin balance disposed thereabove for controlling the movement thereof, of an arm pivoted above the pivot of the balance and connected to the indicating member, a second arm movable about the axis of the balance and yieldably connected to the first arm, and a spring connected between the second arm and the balance.

5. In a measuring instrument, the combination with a horizontally movable indicating member and a Kelvin balance disposed thereabove for controlling the movement thereof, of an arm pivoted above the pivot of the balance, lost-motion connecting means between the arm and the indicating member, a second arm movable about the axis of the balance, lost-motion connecting means between said arms, and a spring connected between the second arm and the balance.

6. In a measuring instrument, the combination with a horizontally movable indicating member having a vertical slot therein and a Kelvin balance disposed thereabove for controlling the movement thereof, of an arm pivoted above the pivot of the balance, a pin carried by the arm and movable in said slot, a second arm movable about the axis of the balance, a pin-and-slot connection between said arms, and a helical spring coiled about the pivot axis of the balance and connected between the second arm and the balance.

7. In a measuring instrument, the combination with a horizontal screw shaft adapted for co-operation with means for rotating the same, a traveling-nut indicating member disposed on the shaft and having a vertical slot, and a Kelvin balance disposed above the shaft for controlling said rotating means, of an arm having a pivot axis vertically above the pivot of the balance, a pin carried by the lower end of the arm and extending into said slot, a second arm freely movable about the axis of the balance, a pin-and-slot connection between the outer end of the second arm and an intermediate portion of the first arm, and a helical spring coiled about the pivot axis of the balance and connected, at its ends, between the second arm and the balance.

In testimony whereof, I have hereunto subscribed my name this 31st day of August, 1922.

CHRISTIAN AALBORG.